INVENTOR.
ROSS E. PINTO
BY Taylor & Neal
ATTORNEYS

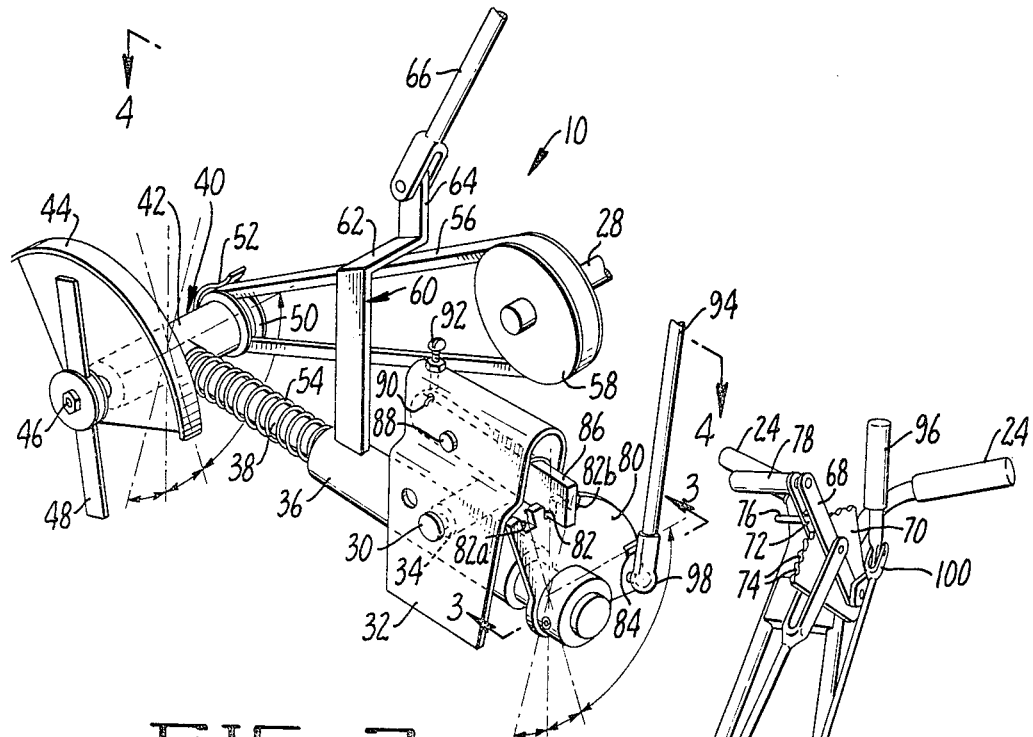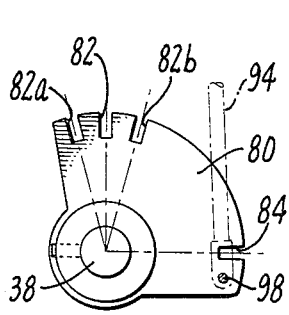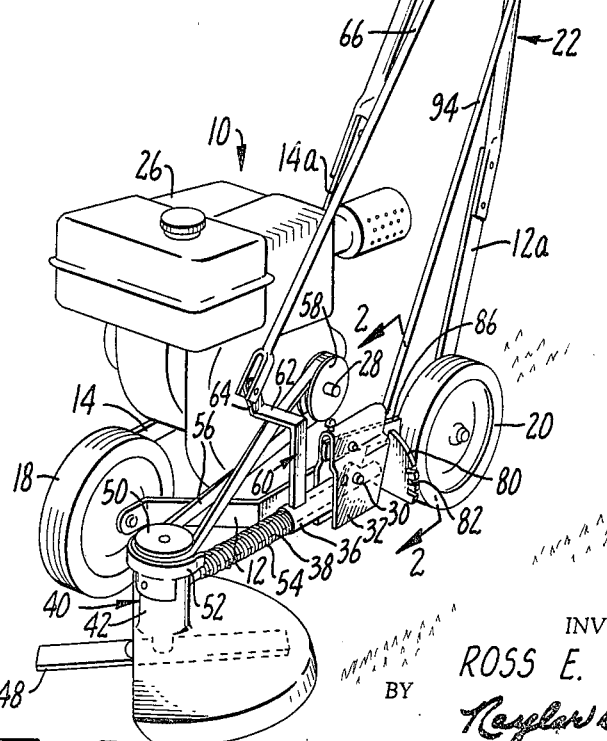

United States Patent Office 3,490,213
Patented Jan. 20, 1970

3,490,213
LAWN EDGER AND TRIMMER ADJUSTMENT APPARATUS
Ross E. Pinto, Torrance, Calif., assignor, by mesne assignments, to McDonough-Starlite, Inc., a corporation of California
Filed Mar. 13, 1968, Ser. No. 712,742
Int. Cl. A01d *35/26*
U.S. Cl. 56—25.4                6 Claims

ABSTRACT OF THE DISCLOSURE

An apparatus for adjusting the angular cutting disposition of a lawn edger and trimmer employing a rotary cutter supported on a longitudinally extending shaft mounted for rocking movement to raise and lower the cutter. The apparatus comprises cooperating detents adapted, upon rocking of the shaft to raise the cutter beyond a predetermined point, to assume a mutually disengaged condition permitting the shaft to be rotated to vary the angular disposition of the cutter and, upon rocking of the shaft to lower the cutter beyond the predetermined point, to assume a mutually engaged condition locking the cutter at any one of a number of predetermined angular dispositions. In the preferred embodiment, remotely operable mechanisms are provided to selectively rock and rotate the shaft and lock the shaft at positions maintaining the cutter at any one of a number of predetermined elevations.

---

The present invention relates to a lawn edging and trimming apparatus and, more particularly, to such an apparatus employing a rotary cutter wherein the angular disposition of the cutter may be selectively varied for trimming and edging purposes.

In the prior art, lawn maintenance machines convertible for use, alternatively, as edgers or trimmers are well known. These machines typically employ a rotary cutting head supported on a journaled longitudinally extending shaft for pivotal movement between an upright edging position and a horizontally disposed trimming position. Such machines also typically provide for selective raising and lowering of the cutting head through rocking of the support shaft.

Prior art machines of the foregoing type have suffered from certain disadvantageous operating characteristics insofar as their provisions for adjustment of the cutting head are concerned. Prime among these characteristics has been the requirement that the operator bend over or stoop from his normal operating posture to effect adjustments. Another of these characteristics has been the danger which resulted because prior art machines have not provided for automatic disengagement of the cutting head drive during adjustment. Still another of these characteristics resides in the inadequate provision for secure and selective adjustment. It is with an aim to avoiding characteristics of this type that the present invention has been developed.

In summary, the present invention may be stated to reside in an improved arrangement for rotating the cutting head support shaft of a lawn edging and trimming machine to selectively vary the angular disposition of the cutting head. The basic arrangement comprises a crank to selectively impart rotation to the shaft about its longitudinal axis and cooperating detents disposed to selectively unlock and lock the shaft against rotation, respectively, responsive to raising and lowering of the shaft and the cutter supported thereby. In its more specific aspects, the invention provides for automatic disengagement of the drive to the cutting head responsive to raising of the shaft to a position wherein the detents unlock.

It is, accordingly, a principal object of the present invention to provide an adjustment arrangement of the type summarized capable of avoiding the disadvantageous characteristics of the prior art.

This and other objects and the details of the invention will become more apparent when viewed in light of the following description and accompanying drawings, wherein:

FIG. 1 is a perspective view of a lawn edging and trimming machine employing the adjustment apparatus of the invention and showing the machine in the process of effecting a trimming operation;

FIG. 2 is a partial view, in perspective, diagrammatically illustrating the adjustment apparatus and its operation and showing the cutting head employed therewith disposed for an edging operation;

FIG. 3 is a partial view, in elevation, taken on the plane designated by line 3—3 in FIG. 2;

Figure 4:
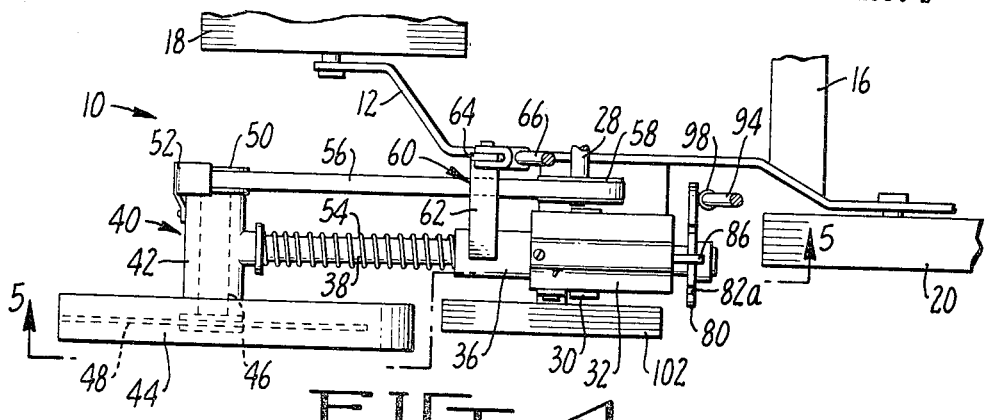
FIG. 4 is an expanded view, in plan, taken on the plane designated by line 4—4 in FIG. 2 and showing, partially, certain frame and wheel structure for the lawn edging and trimming machine omitted from FIG. 2.

Referring now to FIG. 1 of the drawings, the lawn edging and trimming machine with which the adjustment apparatus is employed is designated in its entirety therein by the numeral 10. This machine comprises, as its basic element, a wheel supported chassis having forwardly converging side frame members 12 and 14 interconnected by a rear frame member 16. The chassis is supported by a forward wheel 18 secured between the frame members 12 and 14 and a pair of rearward wheels 20 (only one of which is illustrated) secured laterally of the frame members 12 and 14. The rearward ends of the frame members 12 and 14, designated by the numerals 12a and 14a, respectively, extend upwardly and support a bifurcated guiding handle 22. The guiding handle 22 converges upwardly from its connection to the frame members and is provided with grips 24 at its upper extremity. The frame members of the chassis also support a small internal combustion engine 26. This engine acts as a source of rotary motion imparting power for the machine and is provided with an output shaft 28.

The edging and trimming structure of the machine 10 is mounted for rocking movement relative to the chassis about a bearing pin 30. The bearing pin 30 is supported on the chassis by a housing 32 of substantially inverted U-shaped configuration fixed to the side frame member 12. A sleeve bearing 34 is pivotally received on the pin 30 to rockably support the edging and trimming structure thereon. This bearing is fixed to an elongated sleeve bearing 36 and comprises, with the latter bearing, a composite support bracket rockably mounted within the housing 32.

The sleeve bearing 36 pivotally supports a longitudinally extending shaft 38 extending therethrough. The shaft 38 supports a cutting head 40 of the rotary type at its forward distal end. The cutting head 40 comprises: a sleeve bearing element 42 fixed to the shaft 38 in normal relationship thereto; an arcuate guard 44 secured to the element 42; a cutter shaft 46 extending through and rotatably supported within the element 42; a rotary cutter blade 48 keyed to one end of the shaft 46 within the confines of the guard 44; a V-belt sheave 50 keyed to the end of the shaft 46 opposite that to which the blade 48 is keyed; an arcuate belt confining guard 52 secured to the element 42 and extending partially around the sheave 50; and, a thrust bearing (not illustrated) for the shaft 46 supported on the element 42. A compression coil spring 54 is received around the shaft 38 in interposed relationship between the sleeve bearing 36 and the element 42 to resiliently urge the head 40 away from the bearing 36. As will become more apparent subsequently, this spring functions to maintain tension on the drive belt for the sheave 50 when the cutting head 40 is in operative trimming or edging condition.

Rotation is transmitted from the output shaft 28 of the engine 26 to the cutter shaft 46 through a continuous V-belt 56. The V-belt 56 is trained around a sheave 58 keyed to the shaft 28 and the sheave 50.

The structure thus far described, with the exception of the specific configuration of the housing 32, is of relatively conventional nature. The improvement to which the present invention is directed is concerned, primarily, with an arrangement for turning the shaft 38 to selectively vary the angular disposition of the cutting head 40 and for selectively imparting rocking movement to the bearing 36 to raise and lower the cutting head.

Referring now specifically to that portion of the arrangement designed to selectively impart rocking movement to the sleeve bearing 36, this comprises, as its basic element, an arm 60 fixed to and extending upwardly from the bearing 36. The arm 60 includes an intermediate laterally extending portion 62 disposed over the upper reach of the belt 56 and an upright distal end portion 64. The portion 62, as will become more apparent from the subsequent discussion, is disposed to permit free movement of the belt 56 when the cutter head 40 is lowered to operative trimming or edging condition and, upon elevating of the head to a predetermined degree, to abut against the belt. The latter characteristic can be seen from FIG. 6 wherein the portion 62 is shown depressing the upper reach of the belt towards the sheave 58. The portion 64 is pivotally connected to an operating link 66 extending therefrom to pivotal engagement with a lever 68 mounted on the handle 22. The lever 68 is, in turn, pivotally supported on an arcuate segment 70 fixed to the handle 22. A spring biased dog 72 is carried by the lever 68 for selective engagement with circumferentially-spaced peripheral notches 74 on the segment 70. Through the latter provision, the lever 68 may be locked to the segment 70 at varying angular dispositions. An operating finger 76 is fixed to the dog 72 to facilitate manual retraction of the dog from spring biased engagement with the notches 74. A handle 78 is fixed to and extends laterally from the lever 68 at a position above the finger 76.

Figure 5:
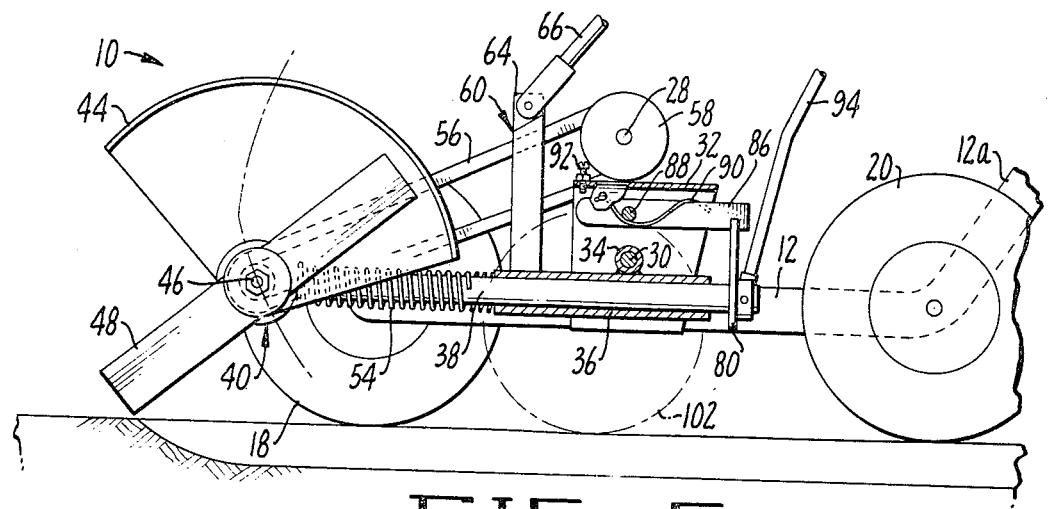
FIG. 5 is a sectional view taken on the plane designated by line 5—5 in FIG. 4 and showing the lawn edging and trimming machine in the process of effecting an edging operation.
Figure 6:
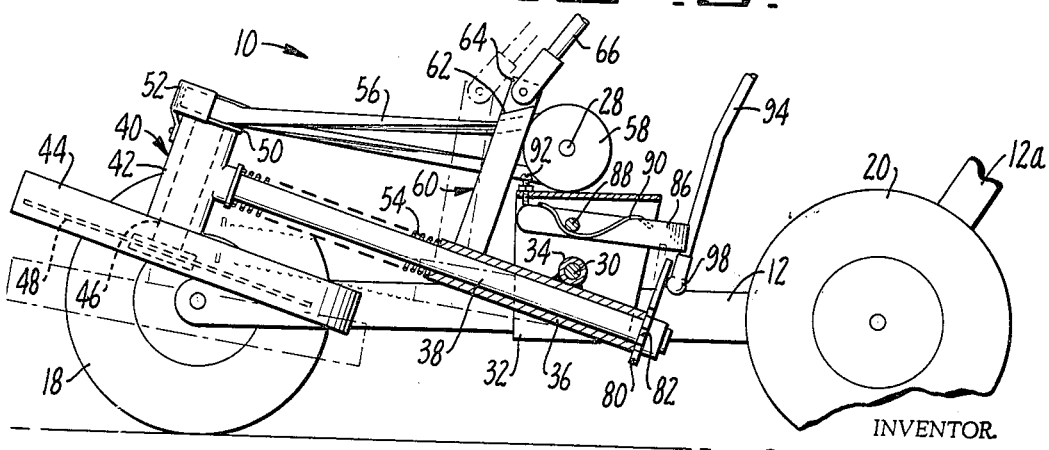
FIG. 6 is a sectional view similar to FIG. 5, but showing the cutting head of the lawn edging and trimming machine in elevated position with the detent structure of the adjustment apparatus disengaged.

The portion of the arrangement designed to selectively vary the angular disposition of the cutting head 40 cooperates, in operation, with the aforedescribed portion provided to impart rocking movement to the sleeve bearing 36. It comprises, as a basic element, an arcuate segment 80 fixed to the shaft 38 in substantially normal relationship thereto. The segment 80 is disposed to assume a position spaced from the bearing 36 when the cutter head is lowered beyond a predetermined point and, to assume abutting engagement with the bearing upon raising of the cutter head beyond this point. This interrelationship of the segment 80 and bearing 36 permits the spring 54 to tension the belt 56 when the cutter head is lowered, as illustrated in FIGS. 1–5, for trimming and edging operations. It also prevents the spring from tensioning the belt when the cutter head is raised beyond a predetermined point responsive to rocking of the bearing 36, as can be seen in FIG. 6.

The segment 80 also functions as a detent through means of circumferentially-spaced notches 82, 82a, 82b, and 84 formed in its peripheral edge. These notches are disposed for alternative mutual engagement with the edge portions of a detent 86 pivotally mounted in the housing 32 in longitudinal alignment with the shaft 38. The detent 86 is pivotally mounted by a pin 88 extending therethrough into openings in the side walls of the housing 32. A looped spring 90 having one end extending through an opening therefor in the housing 32, an intermediate portion extending beneath the pin 88 and a free end portion hooked over the detent 86 normally urges the detent toward the segment 80. A set screw 92 is threadably received in the housing 32 for abutting engagement with the detent to limit the degree to which the spring 90 may swing the detent toward the segment 80. The spring 90 and set screw 92 function to permit the edge portions of the detent 86 to remain in engagement with any one of the peripheral notches in the segment 80 over a predetermined arc of rocking of the bearing 36. This provision facilitates raising and lowering of the cutting head 40 through a predetermined range of elevation while maintaining the head locked against angular displacement around the axis of the shaft 38.

In operation, the set screw 92 is adjusted so that the edge portions of the detent 86 are disposed for engagement with any select one of the peripheral notches in the plate 80 whenever the bearing 36 is rocked downwardly beyond the point where the segment 80 is lifted from abutting engagement with the bearing 36, responsive to tensioning of the belt 56. This point is predetermined by the longitudinal positioning of the segment 80 on the shaft 38 and the length of the belt 56. The interrelationship thus provided, facilitates automatic interruption of the drive to the cutter blade 48 whenever the cutting head 40 is raised beyond the predetermined elevation dictated by the point. Conversely, this interrelationship facilitates transmission imparting engagement of the belt 56 whenever the cutting head 40 is lowered beyond a predetermined elevation dictated by the point.

The peripheral notches in the segment 80 are disposed to lock the segment and the shaft 38 fixed thereto at four selective variable alternative positions. The notch 82 is disposed to lock the segment in a position wherein the cutting head 40 is disposed to locate the blade 48 in a vertical edging position. The notches 82a and 82b are disposed to lock the segment, alternatively, in positions wherein the cutting head 40 is disposed to locate the blade 48 in edging positions inclined 15° to either side of vertical. The notch 84 is disposed to lock the segment 80 in a position wherein the cutting head is disposed so as to locate the blade 48 in a horizontal trimming position. The latter position is illustrated in FIG. 1 and the three alternative edging positions are illustrated, diagrammatically, by the dashed lines in FIG. 2. FIGS. 4 and 5 also illustrate the cutter blade in an edging position.

The segment 80 also functions as a crank to turn the shaft 38 when the detent 86 is disengaged from the notches 82, 82a, 82b and 84, responsive to lifting of the cutting head. To facilitate this function remotely from the handle 22, an operating rod 94 and lever 96 are provided. The rod extends between a pivotal ball joint connection 98 to the segment 80 and a bifurcated pivotal connection 100 to the lever 96. The lever 96 is pivotally mounted on the handle 22 adjacent the aforedescribed lever 68.

It can thus be seen that both the elevation and angular disposition adjustments for the cutting head 44 are remotely operable from the handle 22. Elevation adjustment is accomplished by moving the lever 68 and selectively locking it in place through operation of the dog 72. Angular disposition adjustment is accomplished by first moving the lever 68 to elevate the cutting head to a position wherein the segment 80 and detent 86 are disengaged, then moving the lever 96 to align the desired notch in the segment 80 with the detent 86, and finally lowering the cutting head through movement of the lever 68 to engage the detent and the desired notch. Preferably, the segment 70 is provided with a notch 74 disposed to selectively lock the lever 68 in a position wherein the segment 80 and detent 86 are disengaged. The latter characteristic facilitates ease of the angular disposition adjustment.

Attention is invited to the fact that drive transmission through the belt 56 is interrupted whenever the cutting head 40 is elevated sufficiently to permit angular disposition adjustment. This interruption is assured both by slackening of the belt and engagement of the portion 62 with the upper reach thereof, as illustrated in FIG. 6. The portion 62 also functions to maintain the belt, when slacked, in engagement with the sheave 58.

It is here noted that FIGS. 4 and 5 illustrate a wheel 102 mounted on the housing 32 immediately behind the blade 48. This wheel is detachably secured to the housing 32 and is designed for selective use when edging near curbings and the like.

From the foregoing description, it is believed clear that the present invention distinguishes from the prior art and enables the attainment of the objects initially set forth herein.

What is claimed is:

1. In a lawn edger and trimmer comprising:
   (A) a wheel supported chassis;
   (B) a rotary motion imparting power source supported on said chassis;
   (C) a bracket supporting a bearing having a longitudinally extending axis, said bracket being mounted on said chassis for rocking movement relative thereto about an axis extending transversely of said longitudinally extending axis;
   (D) a shaft supported by and extending longitudinally of said bearing for rotation about the longitudinal axis of said bearing;
   (E) a rotary cutter journalled to said shaft for rotation about an axis extending transversely relative thereto; and,
   (F) power transmitting means operatively connected between said power source and cutter to impart rotary motion from said source to said cutter; and improved arrangement for rotating said shaft about the longitudinal axis of said bearing to selectively vary the angular disposition of the axis of said cutter, comprising:
      (1) crank means secured to said shaft to selectively impart rotation thereto about the longitudinal axis of said bearing;
      (2) a first detent mounted on said chassis against rocking movement with said bracket and rotatation with said shaft;
      (3) a second detent mounted on said shaft for rotation therewith about the longitudinal axis of said bearing, said second detent being movable into and out of engagement with said first detent, responsive, respectively, to rocking movement of said bracket to lower and raise said cutter beyond a predetermined point; and
      (4) mutually engageable means on said detents adapted to lock said shaft against rotation about the longitudinal axis of said bearing at a plurality of angular dispositions relative thereto upon engagement of said detents, whereby:
         (a) upon rocking of said bracket to a position wherein said cutter is raised beyond said predetermined point, said shaft may be rotated to selectively adjust the axis of said cutter to any one of a number of predetermined angular dispositions; and
         (b) upon rocking of said bracket from a position wherein said cutter is raised beyond said predetermined point to a position wherein said cutter is lowered beyond said predetermined point the axis of said cutter is locked in the predetermined angular disposition selected.

2. In a lawn edger and trimmer according to claim 1, the improved arrangement wherein:
   (A) the first detent comprises a dog mounted on said chassis and extending longitudinally of the axis of said bearing;
   (B) the second detent comprises an arcuate segment fixed to said shaft in transverse relationship relative thereto; and
   (C) said mutually engageable means comprise complementary edge portions and notches on said dog and segment, respectively.

3. In a lawn edger and trimmer according to claim 2, the improved arrangement further comprising:
   (A) means mounting said dog on said chassis for limited movement towards and away from said segment to permit the edge portions on said dog to remain in engagement with the notches on said segment through a predetermined arc of rocking movement of said bracket; and
   (B) means resiliently urging said dog toward said segment to maintain the edge portions on said dog in engagement with the notches on said segment through said predetermined arc of rocking movement.

4. In a lawn edger and trimmer according to claim 1, the improved arrangement further comprising:
   (A) first means operatively associated with said bracket to selectively impart rocking movement thereto from a location remote therefrom to raise and lower said cutter; and
   (B) second means operatively associated with said crank means to selectively impart rotation to said shaft through said crank means from a location remote therefrom.

5. In a lawn edger and trimmer according to claim 4, the improved arrangement further comprising means operatively associated with said first means to selectively lock said bracket at any one of a plurality of positions to maintain said cutter at predetermined raised and lowered positions.

6. In a lawn edger and trimmer according to claim 4, wherein the power transmitting means becomes inoperative to impart rotary motion to said cutter upon rocking of said bracket to a position raising said cutter beyond said predetermined point, the improved arrangement wherein said means operatively associated with said first means to selectively lock said bracket is adapted to lock said bracket in a position maintaining said cutter raised beyond said predetermined point.

References Cited

UNITED STATES PATENTS

| | | | |
|---|---|---|---|
| 2,787,107 | 4/1957 | Strasel | 56—25.4 |
| 2,862,344 | 12/1958 | Caudle, et al. | 56—25.4 |
| 2,909,021 | 10/1959 | McLane | 56—25.4 |

ANTONIO F. GUIDA, Primary Examiner

JAMES A. OLIFF, Assistant Examiner